United States Patent
Noll

[15] 3,685,200
[45] Aug. 22, 1972

[54] ELECTRONICALLY AND MANUALLY ANIMATED TALKING DOLL

[72] Inventor: Evelyn Noll, 937 Lincoln Blvd., Santa Monica, Calif. 90403

[22] Filed: Sept. 14, 1970

[21] Appl. No.: 72,035

[52] U.S. Cl. ................... 46/232, 46/135, 46/175 AR
[51] Int. Cl. .............................................. A63h 33/26
[58] Field of Search ........... 46/232, 118, 243 S, 247, 175 AR, 46/135

[56] References Cited

UNITED STATES PATENTS

| | | | |
|---|---|---|---|
| 3,287,849 | 11/1966 | Weiss | 46/232 |
| 2,942,380 | 6/1960 | Coulter | 46/232 |
| 3,080,679 | 3/1963 | Hardigan | 46/232 |
| 2,954,639 | 10/1960 | Walss | 46/118 X |
| 2,704,417 | 3/1955 | Evans | 46/247 |
| 2,974,440 | 3/1961 | Clark | 46/118 |
| 3,376,665 | 4/1968 | Heller | 46/118 |
| 2,633,669 | 4/1953 | Churus | 46/247 |
| 2,700,250 | 1/1955 | Williams | 46/232 X |
| 2,948,069 | 8/1960 | Johnson | 46/247 X |

FOREIGN PATENTS OR APPLICATIONS

| | | | |
|---|---|---|---|
| 289,609 | 10/1931 | Italy | 46/247 |

*Primary Examiner*—F. Barry Shay
*Attorney*—William H. Maxwell

ABSTRACT

An animated doll adapted to reproduce a transcribed voice from a tape recording prepared specially therefor and automatically moving parts of the face in timed relation to the reproduced audible voice, and providing means in combination therewith to be manually operated for the coordinated movement of parts of the face; all of which is directed to amusement, education and for the development of coordination and dexterity in individuals observing and operating the doll. Means are also provided for shutting off the voice and moving an automatically moved face part independently of the use of the reproduced voice.

9 Claims, 4 Drawing Figures

PATENTED AUG 22 1972

INVENTOR.
EVELYN NOLL
BY
W. H. Maxwell

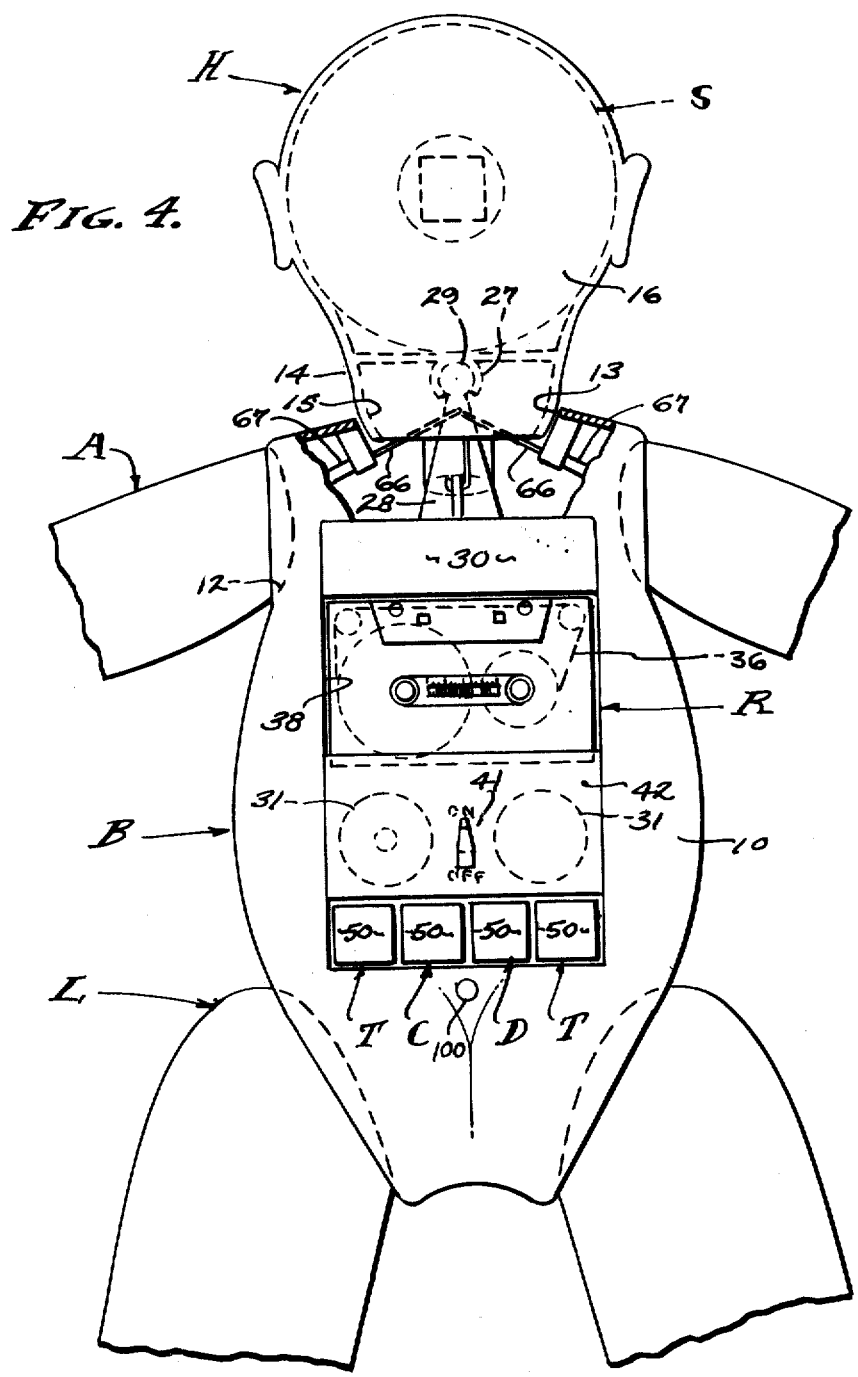

ELECTRONICALLY AND MANUALLY ANIMATED TALKING DOLL

Talking dolls are usually limited in versatility in that the recordings employed therein have been restricted as to replaceability, durability and length of translation. Also, the quality of a realistic voice has been lacking, and there has been an absence of facial articulation coordinated with the voice articulation. Therefore, it is an object of this invention to provide a doll voice of realistic quality with coordinated articulation, and with facial movements modulated to the reproduced voice.

An object of this invention is to provide an electrically reproduced voice that is realistic and which emanates from the lips of the doll. With the present invention, the voice is transcribed upon a tape that is replaceably loaded into the body of the doll and transported over a pick up and amplified and delivered from a speaker. The speaker is installed in the head of the doll and in accordance with the invention is disposed on an axis and facing forwardly through the mouth of the doll, said mouth being articulated to move in synchronism with the audio output of said speaker; thereby simulating the human voice box and movements of the mouth as occurs in the normal forming of words, for example singing and related sounds.

Another object of this invention is to provide means for the manually operable movement of body and facial parts, adapted to be coordinated with the audible voice. With the present invention, the doll body is provided with depressible areas that are manually operable to activate a body part or facial part to a meaningful position. For example, entire members of the body can be moved, or portions of a member can be moved each from a normal unactuated position. As will be described, the means for effecting body and portion movements are mechanical means of versatile form adapted to move by tensioning any part or portion that is required to be meaningfully positioned.

It is still another object of this invention to provide a doll of the character thus far referred to that is educational as well as amusing. With the present invention, cartridge units of tape are loaded into the torso or body and each with a lengthy tape of educational and/or amusing material, or a combination of both which can be cleverly calculated to attract the attention of the listener, especially juvenile listeners who are attentive when their interests are captured. Thus, the example displayed by the realistic audible voice stimulates the desire for manual operation and which promotes participation and attentiveness, all of which is conducive to learning what and how the doll says it.

The various objects and features of this invention will be fully understood from the following detailed description of the typical preferred from and application thereof, throughout which description reference is made to the accompanying drawings, in which:

FIG. 4 is a back view of the doll shown in FIG. 1, with portions thereof broken away to show in section, and taken substantially as indicated by line 4—4 on FIG. 1.

Figure 1:
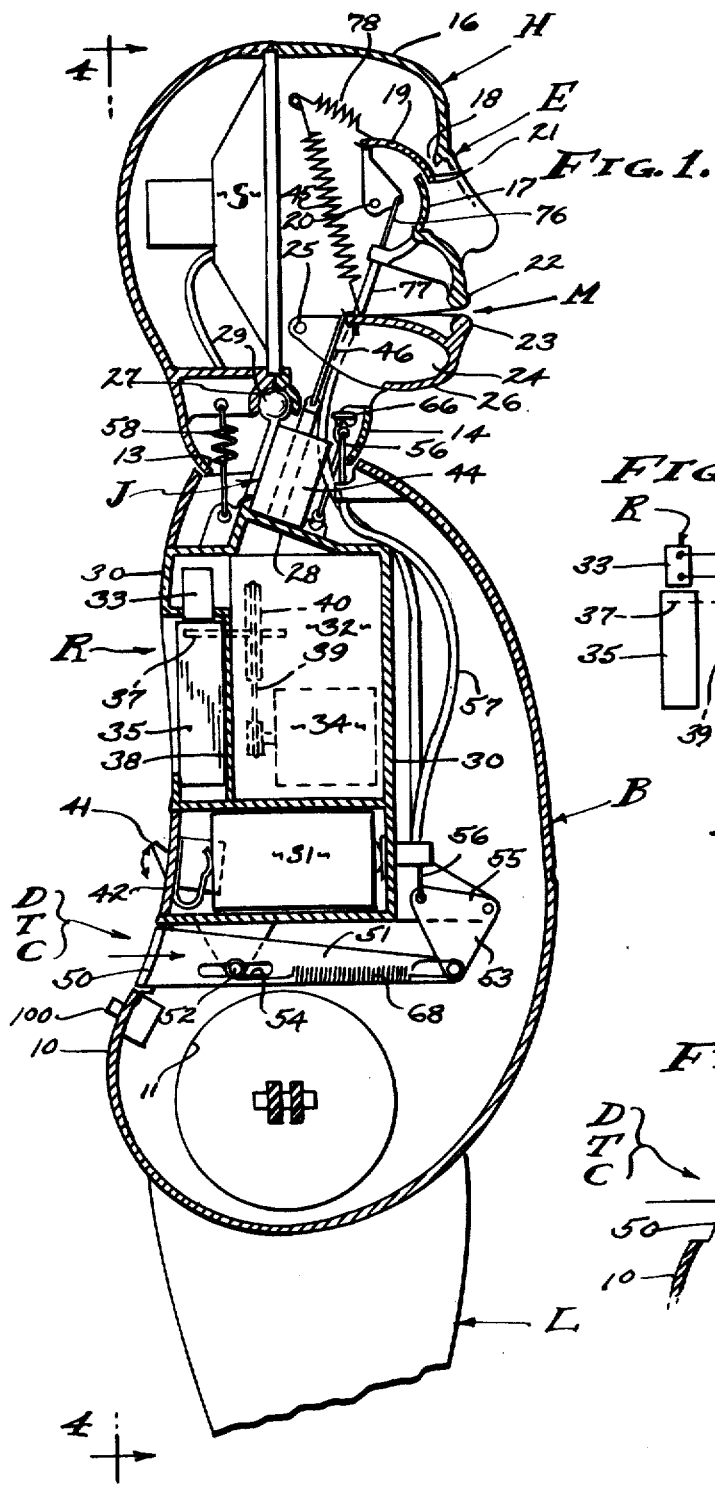
FIG. 1 is a cross sectional elevation of the doll body and head, illustrating the structure of the present invention.

Referring now to the drawings, the doll is a talking doll that is animated both electronically and mechanically. The doll can take any of the usual forms and constructions wherein the major body parts are articulately joined and characterized by a body or torso B, legs L, arms A and a head H. Although it is within the scope of this invention to move any one or all of the major body parts, the legs and arms will be dispensed with and an example of body part movement will be devoted to the head H, the head being most closely associated with expressions of the voice. Further, it is the head which has the facial portions which show meaningful expressions through the positioning thereof, and to this end the eyes E and mouth M are, for example, movable; the eyes to close and the mouth to open. In accordance with the automated animation, an audio replay means R is contained within the body B with its speaker S within the head H, and mouth articulating means J opening the mouth from its normal closed position. And, in accordance with the manual animation, at least one and preferably a plurality of body member and body portion articulating means are provided and for example head nodding means D, head turning means T, and eye closing means C. The various means hereinabove referred to are cooperatively combined in the animated doll as will be now described.

The body or torso B is of a rigid shell-like wall 10, monocoque in form and having the usual pelvic openings 11 for the legs L and the usual pectoral openings 12 for the arms A. As is indicated, the arms and legs have hooks projecting through said openings and with an elastic element tensioned therebetween to draw the opposite appendages into frictional engagement with said wall 10 surrounding said openings respectively. In the case of the head H the body B has an upwardly disposed hemispherically concave opening 13 that receives a complementary hemispherically convex downwardly disposed neck 14 having a generous opening 15 therethrough considerably smaller in diameter than the opening 13. Head H, like the body B, is of a rigid shell-like wall 16 divided into half-shell segments on the transverse vertical plane for assembly around and for the installation of speaker S. As shown best in FIG. 4, the head H is round in transverse cross section and the speaker S is shown as a usual paper cone-permanent magnet round speaker disposed on a horizontal axis coincidental with the center axis of the head H and faced forwardly leaving a chamber between the speaker cone and face wall 16 of the head.

The eyes E are shown to be of the usual fixed construction, in that the eye balls 17 are fixedly carried by the face wall 16 of the head H. However, the eyes are to be closed in which case the wall 16 next adjacent to the upper perimeter of the eyes is slotted at 18 and semispherical eye lids 19 are pivoted together on a transverse horizontal axis 20 coincidental with the theoretical center of the eye, and are thereby adapted to project through the opening to overlie and close the eyes. The exposed perimeter of the lid 19 carries forwardly extending lashes 21, thereby simulating a normal human eye.

The mouth M involves upper and lower lips 22 and 23, the former being fixedly positioned with the wall 16 and the latter being movably carried by a jaw 24. The jaw 24 is a sectional part of the head H and is comprised of a wall 26 pivotally carried by the head H on a transverse axis by means of a pivot 25 located at the rear of the jaw near the ears of the head. The lips 22 and 23 are normally closed when the jaw 24 is held upwardly, and the lips 22 and 23 are permitted to separate so as to open the mouth when the jaw is dropped, forceably as hereinafter described.

The head H carrying the portions to be meaningfully moved, is itself meaningfully moved by the manually operable means D, T and C, and in accordance with the invention is pivotally mounted concentric with said concaved neck opening 13. As shown, the neck 14 is hollow or tubular and with a socket 27 located centrally therein and at the base of what would be the skull. A post 28 projects upwardly through the opening 13 and into the neck 14, and has a ball 29 rotatably captured in the socket 27. The post 28 is rigidly fixed in the body B and fully supports the head H, preferably with the hemispherically mated features free of each other and thereby adapted to move without frictional resistance or noise.

Figure 2:
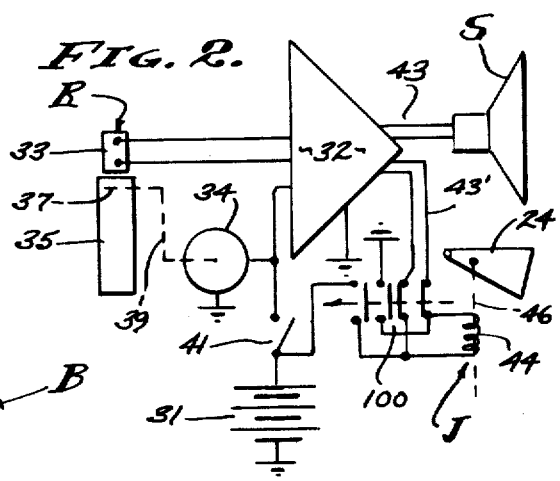
FIG. 2 is a diagrammatic view of the electrical circuitry involved.

The audio replay means R that is contained within the body B is located at the back of the thoracic chest region and is contained within a box-like wall 30 that houses a self-contained electronic sound reproducer comprising, generally, a power supply 31, an amplifier 32, a pick-up head 33, a drive motor 34, and a replaceable cassette 35. The audio replay means R is shown diagrammatically in FIG. 2 and can take various forms, and is preferably a solid state means wherein the amplifier 32 is transistorized and characterized by its low current drain on the power supply 31. The tape 36 is contained on spaced spools in the cassette 35 and is driven alternately therebetween (by reversed installation of the cassette) by a capstan 37 that transports the tape over the pick-up head 33, preferably a piezoelectric head that responds to magnetic inflections imposed in a ferrous emulsion on the tape. The body B is provided with a recess 38 across the back thereof and into which the cassette 35 is removably insertable, to be flush with the back contour of the body. The pick-up head 33 is fixedly positioned at the side of the recess 38 so as to be exposed in close proximity to the tape as it is transported from spool to spool, the capstan 37 entering the cassette through an opening therein so as to driveably engage the tape 36. The usual power transmission is provided between the motor 34 and the capstan 37, including for example, a speed reducer belt 39 and a kinetic energy wheel 40 to smooth the drive operation. A switch 41 accessible on the battery cover at the small of the back, controls both the motor and amplifier electrification, a toggle switch that can be manipulated through the doll's clothing. The amplifier 32 includes the facilities necessary to operate the speaker S, including for example an output transformer, etc.

The mouth articulating means J is provided to open the mouth by dropping the jaw 24 in response to the intensity of the audio signal emanating from the amplifier 32. Consequently, the amplifier has output lines 43 and 43' extending to the speaker S and to the means J respectively, the latter means comprising an electro magnet 44 with its winding energized by the flow of current in line 43'. A spring return 45 is provided to normally close the jaw 24 and a tension link 46 extends to the jaw and connects thereto at a lever point, to lower the jaw when the magnet 44 is energized. The spring 45 is yieldingly urged to variable positions depending upon the intensity of the audio-signal, and to the end that the audio signals of greatest intensity lower the jaw 24 to the greatest angular displacement. In accordance with the invention, the electro magnet 44 is a solenoid located in the throat region of the neck 14, and link 46 operates as a tendon to pull the jaw 24 open against the tension spring 45.

Figure 3:
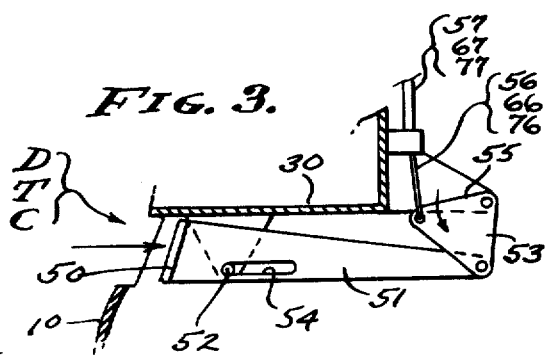
FIG. 3 is a fragmentary view of a portion of the mechanism shown in FIG. 1, in an operated position.

The manually operable articulating means D, T and C are alike in that each comprises a manually depressible element located in the surface of the body B. A preferred location for the depressible elements is at the small of the back and immediate below the battery cover 42, a description of one such element sufficing for all. The depressible area involves a panel 50 carried on a movable slide 51 supported within the body B below the box wall 30 on a guide 52 and lever 53. The guide 52 is a rod that is fixed to extend transversely near the posterior of the body and the slide is provided with a slot 54 by which it is confined to a fore and aft direction of limited travel. The lever 53 is a depending arm located near the anterior of the body and of a bell-crank form having a rearwardly disposed lever arm 55, the lever 53 being pivotally connected to the slide; whereby forward depression of a panel 50 results in a downward rotation of lever arm 55 (see FIG. 3).

Referring now to the head nodding means D, the lever arm 55 rotated by the depressible panel 50 immediate to the right of the center plane of the body B is connected vertically by a tension link 56 (a flexible wire) to the head H forward of the pivot 27-29. In carrying out the invention, the link 56 extends through a flexible tubing 57 anchored at its opposite ends in the body B, the uppermost end being anchored below the connection, and the link 56 operating as a tendon to pull the head downward against a tension spring 58 extending between the head H and body B rearward of the pivot 27-29.

Referring now to the head turning means T, there are two such means of opposite disposition to turn the head right or left, and one of which will be described. The lever arm 55 rotated by the depressible panel 50 outermost to the side of the body B associated with the direction of turning is connected horizontally by a tension link 66 (a flexible wire) to the head H forward of the pivot 27-29. The link 66 extends through a flexible tubing 67 anchored at its opposite ends in the body B, the uppermost end being anchored to the side of turning, and the link 66 projecting inwardly and operating as a tendon to pull the head to the anchored side against a tension spring 68 of the opposing means T. The springs 68 extend between the body and slides 51 in each instance, to urge them rearwardly, there being a lost motion extension of slots 54 and springs 68 to permit over travel, and the coils of the springs 68 closing in order to cause normal centering of the head.

Referring now to the eye closing means C, the lever arm 55 rotated by the depressible panel 50 immediate to the left of the center plane of the body B is connected by a tension link 76 (a flexible wire) to the eye lids 19 forward of the pivot axis 20. The link 76 extends through a flexible tubing 77 anchored at its opposite ends, the uppermost end being anchored in the head below the connection, and the link 76 operating as a tendon to pull the eye lids downward against a tension spring 78 extending between the lids 19 and the head H upwardly and rearward of the pivot axis 20.

In accordance with the invention, the mouth articulating means J is also responsive to manual depressible element located so as to be articulated at will. To this end a push button switch 100 is provided, preferably at the small of the back; a switch that simultaneously disconnects the audio signal through output lines 43 and 43' while directly connecting the power supply 31 to the magnet 34. In practice, the switch 100 is a multicontact switch, as shown, having separate circuits handling the power lines required and completely separating the audio circuit from the grounded circuit of the power supply. Thus, the doll's mouth can be moved for ventriloquistic effects, the opening of the mouth being controlled by the depression time of the button switch 100.

From the foregoing, it will be seen that I have provided a unique and practical doll that is voiced and animated, portions of the body being automated to have meaningful positions coordinated with the voice output, and other portions thereof manually positioned. The audio replay means R can be selectively activated with unlimited numbers of cassetts containing amusing as well as educational information as may be desired. It is a simple matter to activate the replay means R by manipulating the switch 41 to the "ON" position, and to animate the doll manually as prompted by the voice activity, simply by depressing the various panels 50 thereby imposing meaningful positions to the aforementioned portions of the body.

Having described only a typical preferred form and application of my invention, I do not wish to be limited or restricted to the specific details herein set forth, but wish to reserve to myself any modifications or variations that may appear to those skilled in the art:

Having described my invention, I claim:

1. An automatically and manually animated talking doll adapted to reproduce a transcribed voice and to impose meaningful expression to at least one body part and including, a body having a head and including at least one movable body part, an electrically powered audio replay means housed within the body and having a loudspeaker powered by an audio amplifier, said at least one body part responsively positioned by means powered by said audio amplifier, and an electrically powered switch means housed within the body and operable when manually actuated to disconnect said second mentioned means from the audio amplifier and to electrically reconnect the same in a circuit independent of said audio amplifier so as to responsively move said at least one body part while said audio amplifier is disconnected.

2. The animated talking doll as set forth in claim 1 and wherein the loudspeaker of the audio replay means is of a diameter substantially coextensive with the diameter of and housed within the head of the doll on an axis projected forwardly through the face wall of the head and in a plane normal thereto at the major cross section of the head.

3. The animated talking doll as set forth in claim 1, wherein the head is supported upon a pivot carried by a neck projecting from the body, and wherein said means positioning said at least one body part, namely a jaw part of said doll, is an electromagnet fixedly mounted in said neck and connected to said jaw part to move the latter with respect to the head by a link, there being jaw part return means connected with said link 4. The animated talking doll as set forth in Claim 1, wherein the loudspeaker of the audio replay means is of a diameter substantially coextensive with the diameter of and housed within the head of the doll on an axis projected forwardly through the face wall of the head and in a plane normal thereto at the major cross section of the head, the head being supported upon a pivot carried by a neck projecting from the body, wherein said means positioning said at least one body part, namely a jaw part of the doll, is an electromagnet fixedly mounted in said neck and connected to said jaw part to move the latter with respect to the head by a link, and wherein the said at least one body part, the mouth, is yieldingly biased by spring means in opposition to force applied by the first mentioned means positioning the same.

5. The animated talking doll as set forth in claim 1, wherein the audio replay means substantially occupies the body, and wherein a second body part is meaningfully positioned by means including a manually depressible body panel connected by a shiftable cable, flexible and guided through a tubular member, to the said second body part to move the same against spring return means.

6. The animated talking doll as set forth in claim 1, wherein the audio replay means substantially occupies the body, and wherein a movable second body part is meaningfully positioned by independent means including a manually depressible body panel connected by a shiftable cable, flexible and guided through a tubular member, to the said second body part to move the said second body part against spring return means.

7. The animated talking doll as set forth in claim 1, wherein the audio replay means substantially occupies the body, and wherein the head is a movable part supported on a pivot carried by the body, there being means to move the head comprising a manually depressible body panel connected by a shiftable cable, flexible and guided through a tubular member, to the head forward of the pivot therefor to move the same against spring return means.

8. The animated talking doll as set forth in claim 1, wherein the audio replay means substantially occupies the body, wherein the head is a movable part, and wherein eye lids in the head are a movable part with means to close the same comprising a manually depressible body panel connected by a shiftable cable, flexible and guided through a tubular member, to the eye lids to move the same downwardly against spring return means.

9. The animated talking doll as set forth in claim 1, wherein the audio replay means substantially occupies the body, and wherein the head is a movable part supported on a pivot carried by the body, there being independently and oppositely operable means to turn the head each comprising a manually depressible body panel connected by a shiftable cable, flexible and guided through a tubular member, to the head forward of the pivot therefor, to move the head against spring return means.

* * * * *